United States Patent [19]

Gibbon

[11] Patent Number: 5,024,863
[45] Date of Patent: Jun. 18, 1991

[54] ENGINE GASKET WITH OIL IMPERMEABLE SURFACE

[75] Inventor: Robert M. Gibbon, Fort Worth, Tex.

[73] Assignee: JMK International, Inc., Fort Worth, Tex.

[21] Appl. No.: 474,503

[22] Filed: Feb. 2, 1990

[51] Int. Cl.⁵ .............................................. B05D 3/02
[52] U.S. Cl. .................................... 427/387; 264/129; 277/235 B
[58] Field of Search ............ 264/129; 277/228, 235 R, 277/235 A, 235 B; 428/447; 427/387

[56] References Cited

U.S. PATENT DOCUMENTS

| 4,500,100 | 2/1985 | Bindel et al. | 277/235 B |
| 4,580,794 | 4/1986 | Gibbons | 277/228 |
| 4,681,800 | 7/1987 | Zerfass et al. | 277/235 X |
| 4,720,316 | 1/1988 | Ruoff | 277/235 X |

Primary Examiner—Michael Lusignan
Attorney, Agent, or Firm—Charles D. Gunter, Jr.

[57] ABSTRACT

A method is shown for manufacturing an engine gasket having reduced oil permeability. The engine gasket is formed in the desired shape from a silicone rubber compound having an inner surface exposed to hot engine oil and an outer surface. A silicone varnish coating is applied to at least the inner surface of the engine gasket, whereby the inner surface is substantially coated by the silicone varnish coating.

4 Claims, 2 Drawing Sheets

ENGINE GASKET WITH OIL IMPERMEABLE SURFACE

BACKGROUND OF THE INVENTION

1. Cross-reference to Related Applications

The present application is related to the co-pending application of Robert M. Gibbon, entitled "METHOD OF MANUFACTURING ELASTOMERIC ENGINE COMPONENTS", filed Nov. 6, 1989, Ser. No. 07/432,081, and assigned to the assignee of the present invention.

2. Field of the Invention

The present invention relates to elastomeric engine components and, specifically, to a method for manufacturing an improved engine gasket having an oil impermeable surface to prevent thermocycling of engine oil through the gasket during use.

3. Description of the Prior Art

A variety of a elastomeric materials are used as components found in the engine compartment of a vehicle. These elastomeric materials include natural or organic and synthetic rubbers, for instance, EPDM, SBR, butyl, nitrile and neoprene, chlorosulfonated polyethylene, fluorocarbon containing compounds, urethanes and the like. Elastomeric engine components such as engine gaskets and spark plug boots can advantageously be formed of silicone rubber which provides enhanced stability at elevated temperatures and resistance to contamination by engine fumes, leakage and the like.

In spite of the many advantages offered by silicone rubber as a gasket material, in some specific applications the inner side of the gasket which is exposed to hot oil in the vehicle engine tends to absorb some of the oil and swells slightly. As the gasket and confronting metal surfaces of the engine cool, the absorbed oil is squeezed out of the gasket in both the inner and outer directions. This "thermocycling" which results from alternate engine heating and cooling causes the absorbed oil to be pumped slowly through the silicone rubber gasket until it permeates through the cross-sectional thickness of the gasket from the inner side to the outer side.

The present invention has as its object to provide an improved engine gasket with an oil impermeable inner surface which prevents thermocycling of absorbed oil and, hence, permeation of the gasket.

The invention has particular application to an engine gasket formed of silicone rubber and used as an engine component of a vehicle engine such as the engine of a passenger automobile.

SUMMARY OF THE INVENTION

In the method of the invention, an engine gasket is first formed in the desired shape from a silicone rubber compound, the engine gasket having an inner surface exposed to engine oil and an outer surface. A silicone varnish coating is applied to at least the inner surface of the engine gasket, whereby the inner surface is substantially coated by the silicone varnish coating.

Preferably, the silicone varnish coating comprises a silicone resin paint, a solvent and a catalyst. The silicone varnish coating provides a flexible surface coating on the silicone rubber gasket which prevents thermocycling of absorbed oil through the cross-sectional diameter of the gasket.

Additional objects, features and advantages will be apparent in the written description which follows.

BRIEF DESCRIPTION OF THE DRAWINGS

in FIG. 1.

DETAILED DESCRIPTION OF THE INVENTION

Figure 1:
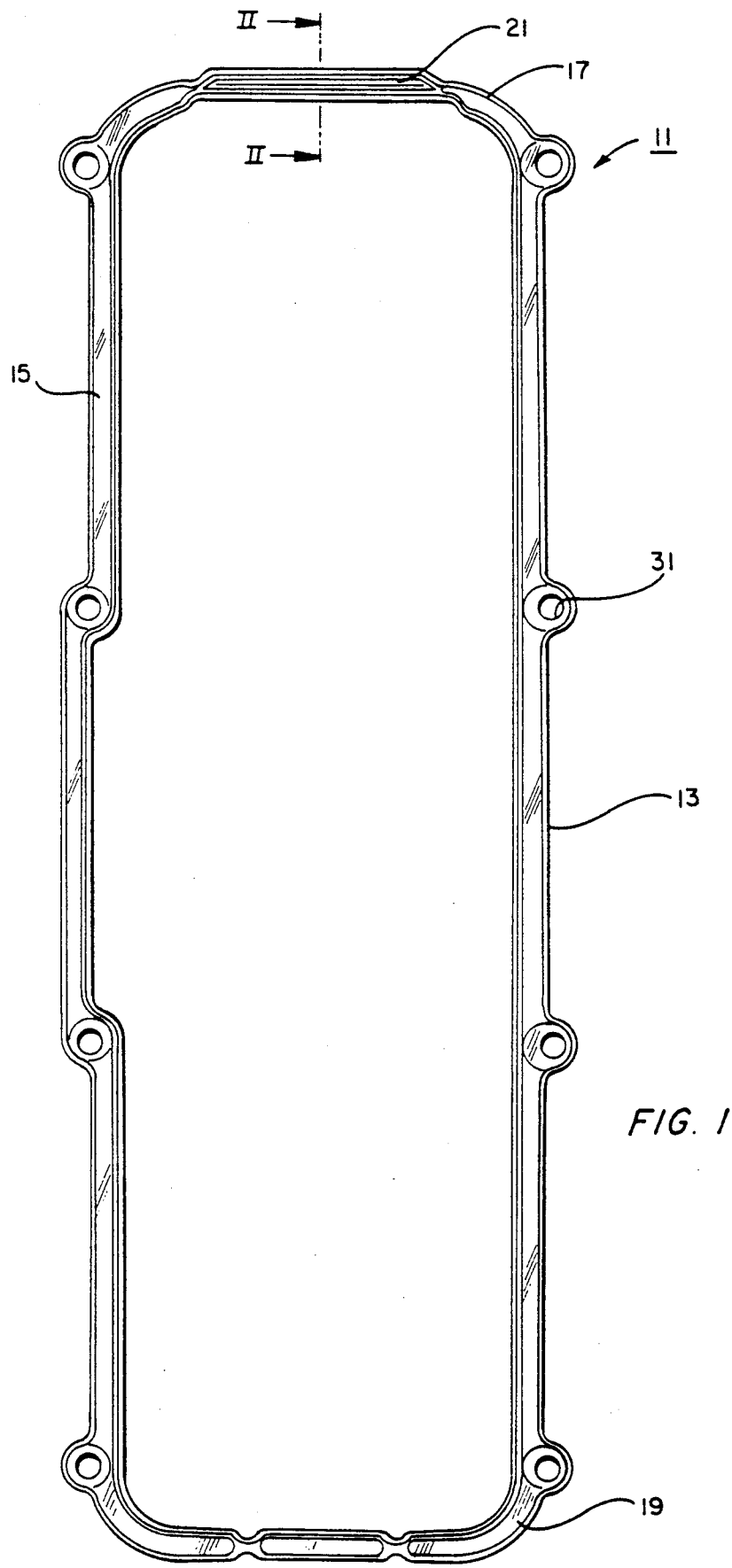
FIG. 1 is a top perspective view of the silicone rubber gasket manufactured according to the method of the invention.

The method of the invention can be used to reduce the oil permeability of a variety of elastomeric components of the type typically utilized on a vehicle engine, such as the engine gasket used to form an oil seal between two confronting metal surfaces of the engine. The engine gasket may be formed from a variety of elastomeric materials including natural or organic and synthetic rubbers, for instance, EPDM, SBR, butyl, nitrile, neoprene, urethanes, and the like. The preferred engine gaskets of the invention are formed of silicone rubber which is preferred because of its stability at elevated temperatures and resistance to contamination by engine fumes, leakage, and the like.

A typical silicone rubber composition of the type useful for the purposes of the present invention will contain about 100 parts silicone gum or polymer, about 40 parts filler, from about 0.5 to 2.0 parts catalyst and from 0 to 10 parts of other enhancement additives. Typical silicone polymers or gums include dimethyl polysiloxane polymers with optional vinyl groups replacing methyl groups on the polymer chain. The vinyl level will generally be about 0 to 5 mole percent with a molecular weight of the polymer typically being about one million. Typical fillers include fume silica, precipitated silica, ground quartz, calcium carbonate, and iron oxide. Other conventional enhancement additives include heat stabilizers, structure control additives, process aids and pigments.

The silicone rubber compositions utilized to form the gaskets of the invention are preferably heat cured in a mold in the desired shape. Silicone rubber compositions of the above type are well known and can be prepared by standard methods known in the art. A discussion of the preparation of such compounds can be found, for example, in: Eaborn, C., *Organo Silicone Compounds*, Academic Press, New York, 1960; McGregor, R. R., *Silicones and Their Uses*, McGraw Hill Book Company, New York, 1954; Rochow, E. G., *An Introduction To The Chemistry of Silicones*, Second Edition, John Wiley and Sons, New York, 1951.

A preferred silicone rubber compound useful for the practice of the present invention is comprised of 100 parts by weight dimethyl vinyl siloxy-ended polydiorganosiloxane gum having as a percentage of all organic radicals in the gum, 99.85% by weight methyl radicals and 0.15% by weight vinyl radicals; 7 parts by weight hydroxyl-ended polydimethylsiloxane having about 3.0 weight percent silicon bonded hydroxyl; 30 parts by weight fumed silica filler having a surface area of 300 $m^2/g$; and 0.8 parts by weight of 2.5-dimethyl-2.5(t-butylperoxy) hexane.

The gasket is formed by blending or milling together the various constituents to form an uncured rubber composition. The uncured silicone rubber composition is then injected into a mold cavity which can contain treated and primed metal reinforcing rails, as described in U.S. Pat. No. 4,719,065, entitled "METHOD OF BONDING SILICONE RUBBER TO METAL", issued Jan. 12, 1988, and assigned to the assignee of the present invention. The silicone rubber composition is then heat cured in the mold to bond the treated and primed metal rails to the silicone rubber composition and form a reinforced gasket of the desired shape. For compositions of the type described, curing using molding conditions of 340° F. for about ten minutes is generally acceptable.

Figure 2:
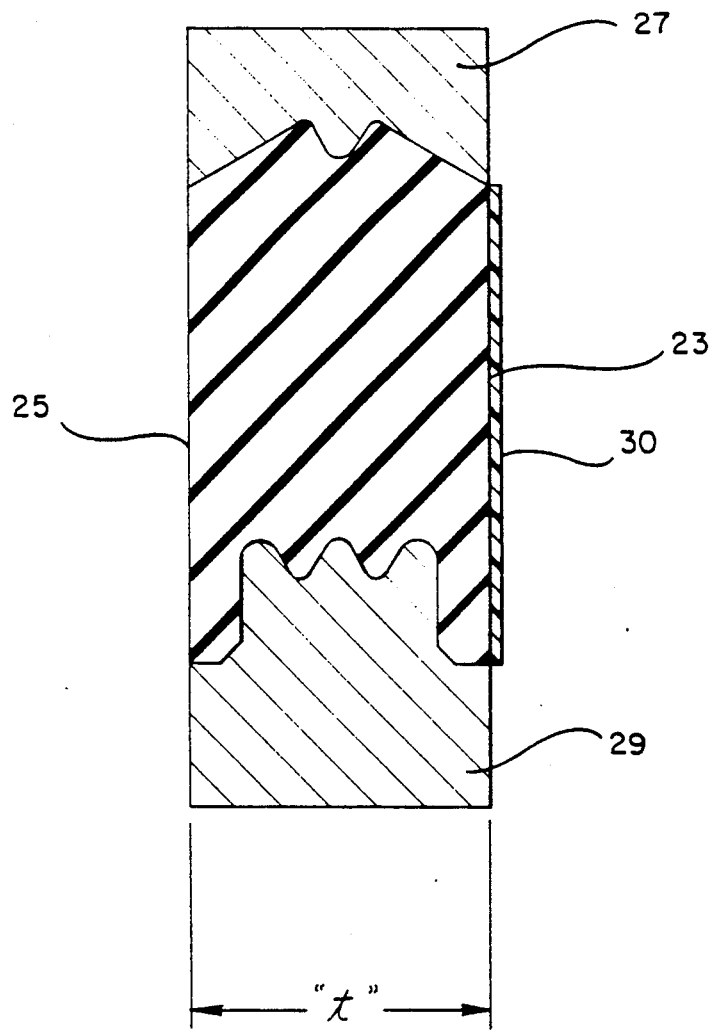
FIG. 2 is a cross-sectional view taken along lines II—II.

FIG. 1 shows an engine gasket, designated generally as 11, formed according to the previously described method. The gasket 11 has a generally rectangular configuration with opposing long sides 13, 15 and opposing short sides 17, 19. In the embodiment shown, at least one of the short sides 17, 19 includes a fleshy portion or "end plug" 21 of silicone rubber which is of a greater cross-sectional thickness than the remaining gasket configuration. As shown in FIG. 2, the engine gasket 11 has planar inner and outer surfaces 23, 25 separated by a thickness t. The gasket is adapted to be received between the confronting surfaces 27, 29 of a vehicle engine which are held in position, as by bolts (not shown) received through the bolt openings 31 (FIG. 1). In the embodiment shown, the gasket inner surface 23 is exposed to hot oil being circulated within the engine.

In the next step of the method of the invention, at least the inner surface 23 of the engine gasket is coated with a flexible surface coating 30 which is effective to reduce the oil permeability of the gasket. Preferably, the coating is a silicone varnish coating which adheres well to the silicone rubber composition of the gasket and, which is flexible in use. A particularly preferred formulation is as follows:

1 gallon SR 125 silicone resin (General Electric);
1 gallon xylene solvent;
10 grams zinc octoate catalyst.

The SR 125 silicone resin is commercially available from General Electric Company, Silicone Products Division, Waterford, New York. It has the following published specifications:

| | |
|---|---|
| silicone content, % | 50 |
| solvent | xylene |
| specific gravity, 25° C. | 1 |
| density, lbs./gal. | 8.33 |
| viscosity at 25° C., cps | 110–320 |
| flash point, °C. | 25 |

The coating of silicone varnish can be applied by brushing, dipping or spraying the engine gasket. A coating thickness of about 1/1000 of an inch has produced acceptable results.

In a test of the effectiveness of the silicone varnish coating, a gasket was coated as described and installed within a test fixture. Engine oil was heated to 250° F. and alternately circulated for eight hours and cooled for eight hours. The test gasket was examined every 24 hours for any oil permeation on the outer surface of the gasket. The varnished gasket showed no oil permeation after 600 hours. An identical unvarnished gasket showed oil permeation after 100 hours, by comparison.

An invention has been provided with several advantages. The silicone varnish adheres well to the inner surface of the silicone engine gasket. It provides a flexible surface coating which eliminates oil permeability due to thermocycling in use. The coating can conveniently be applied at the end of the normal manufacturing operation so that normal process operations are not disrupted. The added coating does not add appreciably to the cost of the manufacturing operation.

While the invention has been shown in only one of its forms, it is not thus limited but is susceptible to various changes and modifications without departing from the spirit thereof.

I claim:

1. A method for manufacturing an engine gasket for a vehicle engine having reduced oil permeability, the method comprising the steps of:
   first, forming the engine gasket in the desired shape from a silicone rubber compound, the engine gasket having an inner surface exposed to hot engine oil and an outer surface; and
   next, applying a silicone varnish coating to at least the inner surface of the engine gasket after the gasket is formed, whereby the inner surface is substantially coated by the silicone varnish coating.

2. A method for manufacturing an engine gasket for a vehicle engine having reduced oil permeability, the method comprising the steps of:
   first, forming the engine gasket in the desired shape from a silicone rubber compound comprising a polyorganosiloxane gum, a filler and a catalyst, the engine gasket having an inner surface exposed to hot engine oil and an outer surface;
   next, applying a silicone varnish coating to at least the inner surface of the engine gasket after the gasket is formed, whereby the inner surface is substantially coated by the silicone varnish coating to provide a flexible surface coating, the silicone varnish coating comprising a silicone resin, a solvent and a catalyst; and
   wherein the engine gasket is formed in a generally rectangular configuration having a pair of oppositely arranged long sides and a pair of oppositely arranged short sides, at least one of the short sides having an intermediate fleshy portion of silicone rubber which is of a greater cross-sectional thickness than the remaining portions of the engine gasket, the silicone varnish being applied to the inner surface of the fleshy portion to decrease the oil permeability of the inner surface.

3. The method of claim 2, wherein the silicone varnish coating is applied approximately 0.001 inch thick.

4. The method of claim 2, wherein the silicone varnish coating is blended from approximately one gallon silicone resin, one gallon xylene solvent and 10 grams of zinc octoate catalyst.

* * * * *